(12) United States Patent
Syed et al.

(10) Patent No.: US 12,462,893 B2
(45) Date of Patent: Nov. 4, 2025

(54) CONDUCTANCE MODULATION IN COMPUTATIONAL MEMORY

(71) Applicant: International Business Machines Corporation, Armonk, NY (US)

(72) Inventors: Ghazi Sarwat Syed, Kilchberg (CH); Benedikt Kersting, Lüdinghausen (DE); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 18/368,158

(22) Filed: Sep. 14, 2023

(65) Prior Publication Data

US 2025/0095764 A1  Mar. 20, 2025

(51) Int. Cl.
*G11C 29/52* (2006.01)
*G11C 11/56* (2006.01)
(52) U.S. Cl.
CPC .......... *G11C 29/52* (2013.01); *G11C 11/5628* (2013.01); *G11C 11/5642* (2013.01); *G11C 11/5678* (2013.01); *G11C 2207/2254* (2013.01)
(58) Field of Classification Search
CPC . G11C 29/52; G11C 11/5628; G11C 11/5642; G11C 11/5678; G11C 11/1659; G11C 11/1673; G11C 11/54; G11C 2207/2254; G11C 13/0004; G11C 13/003; G11C 13/004; G11C 2213/79
See application file for complete search history.

(56) References Cited

U.S. PATENT DOCUMENTS

| 9,842,639 B1 | 12/2017 | Guo et al. |
| 2013/0223133 A1 | 8/2013 | Azuma et al. |
| 2021/0117499 A1 | 4/2021 | Qin et al. |
| 2022/0165948 A1* | 5/2022 | Kersting .............. H10N 70/823 |

FOREIGN PATENT DOCUMENTS

WO  2013055332 A1  4/2013

OTHER PUBLICATIONS

Bhattacharjee et al: NEAT: Nonlinearity Aware Training for Accurate, Energy-Efficient, and Robust Implementation of Neural Networks on 1T-1R Crossbars 11, IEEE Transactions on Computer-Aided Design of Integrated Circuits and Systems, IEEE, USA, Sep. 2, 2021, pp. 2625-2637, vol. 41, No. 8.

(Continued)

*Primary Examiner* — Sultana Begum
(74) *Attorney, Agent, or Firm* — SCULLY, SCOTT, MURPHY & PRESSER, P.C.; Kimberly Zillig

(57) ABSTRACT

Systems and methods for modulating conductance of a plurality of unit cells are described. A controller can determine a plurality of conductance values for a plurality of unit cells arranged in a crossbar arrangement. The plurality of unit cells can include non-volatile memory devices. The plurality of conductance values can be less than maximum conductance values of the plurality of unit cells. The controller can determine a read gate voltage for driving a plurality of access transistors to read from connected to the plurality of unit cells under a read operation. The controller can map a plurality of weights to the plurality of conductance values and to the read gate voltage.

17 Claims, 12 Drawing Sheets

(56) References Cited

OTHER PUBLICATIONS

Giacomo et al: "Conductance Variations and Their Impact on The Precision of In-Memory Computing with Resistive Switching Memory (RRAM)", 2021 IEEE International Reliability Physics Symposium (IRPS), Mar. 21, 2021, pp. 1-8.

International Searching Authority, "Notification of Transmittal of the International Search Report and the Written Opinion of the International Searching Authority, or Declaration," Patent Cooperation Treaty, Nov. 25, 2024, 8 pages, International Application No. PCT/IB2024/057811.

Xie et al: "A High-Parallelism RRAM-Based Compute-In-Memory Macro With Intrinsic Impedance Boosting and In-ADC Computing", IEEE Journal on Exploratory Solid-State Computational Devices and Circuits, Mar. 14, 2023, pp. 38-46 vol. 9, No. 1.

Le Gallo et al, "A 64-core mixed-signal in-memory compute chip based on phase-change memory for deep neural network inference", arXiv:2212.02872v1 [cs.ET] Dec. 6, 2022,25 pages, https://arxiv.org/pdf/2212.02872v1.pdf.

Wan et al,"A compute-in-memory chip based on resistive random-access memory", Nature vol. 608, Published online: Aug. 17, 2022,29 pages, https://www.nature.com/articles/s41586-022-04992-8.

\* cited by examiner

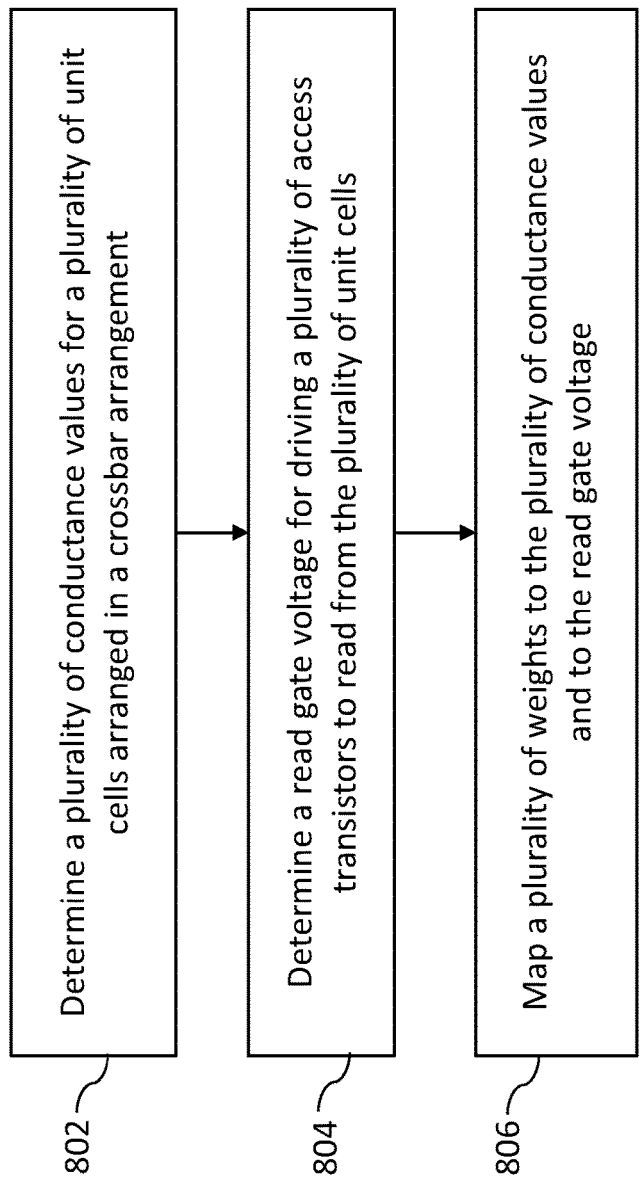

CONDUCTANCE MODULATION IN COMPUTATIONAL MEMORY

BACKGROUND

The present application relates generally to analog memory devices and more particularly to techniques for modulating conductance values in computational memory devices.

Computational memory devices, or analog memory devices, can be utilized for in-memory computing. In-memory computing hardware can increase speed and energy efficiency, providing potential performance improvements. Rather than moving data from memory devices to a processor to perform a computation, analog memory devices can perform computation in the same place (e.g., in the analog memory) where the data is stored. Because there is no movement of data, tasks can be performed faster and require less energy.

BRIEF SUMMARY

The summary of the disclosure is given to aid understanding of a system and method of optimizing conductance range of unit cells in analog memory devices. Access transistors of the unit cells and conductance values of the unit cells can be used for mapping values to the unit cells, which can provide improved efficiency, and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the system and/or their method of operation to achieve different effects.

In one embodiment, a method for operating an analog memory device is generally described. The method can include determining a plurality of conductance values for a plurality of unit cells arranged in a crossbar arrangement. The plurality of unit cells can include non-volatile memory (NVM) devices, and the plurality of conductance values can be less than maximum conductance values of the plurality of unit cells. The method can further include determining a read gate voltage for driving a plurality of access transistors to read from the plurality of unit cells. The method can further include mapping a plurality of weights to the plurality of conductance values and to the read gate voltage.

In one embodiment, a system for operating an analog memory device is generally described. The system can include a memory device and a controller. The memory device can include a plurality of unit cells arranged in a crossbar arrangement. The plurality of unit cells can include non-volatile memory (NVM) devices. The memory device can further include a plurality of access transistors connected to the plurality of unit cells. The controller can be configured to determine a plurality of conductance values for the plurality of unit cells. The plurality of conductance values can be less than maximum conductance values of the plurality of unit cells. The controller can be further configured to determine a read gate voltage for driving the plurality of access transistors to read from the plurality of unit cells. The controller can be further configured to map a plurality of weights to the plurality of conductance values and to the read gate voltage.

In one embodiment, a computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 8 is a flow diagram illustrating a method of performing conductance modulation in computational memory in one embodiment.

DETAILED DESCRIPTION

Figure 1:
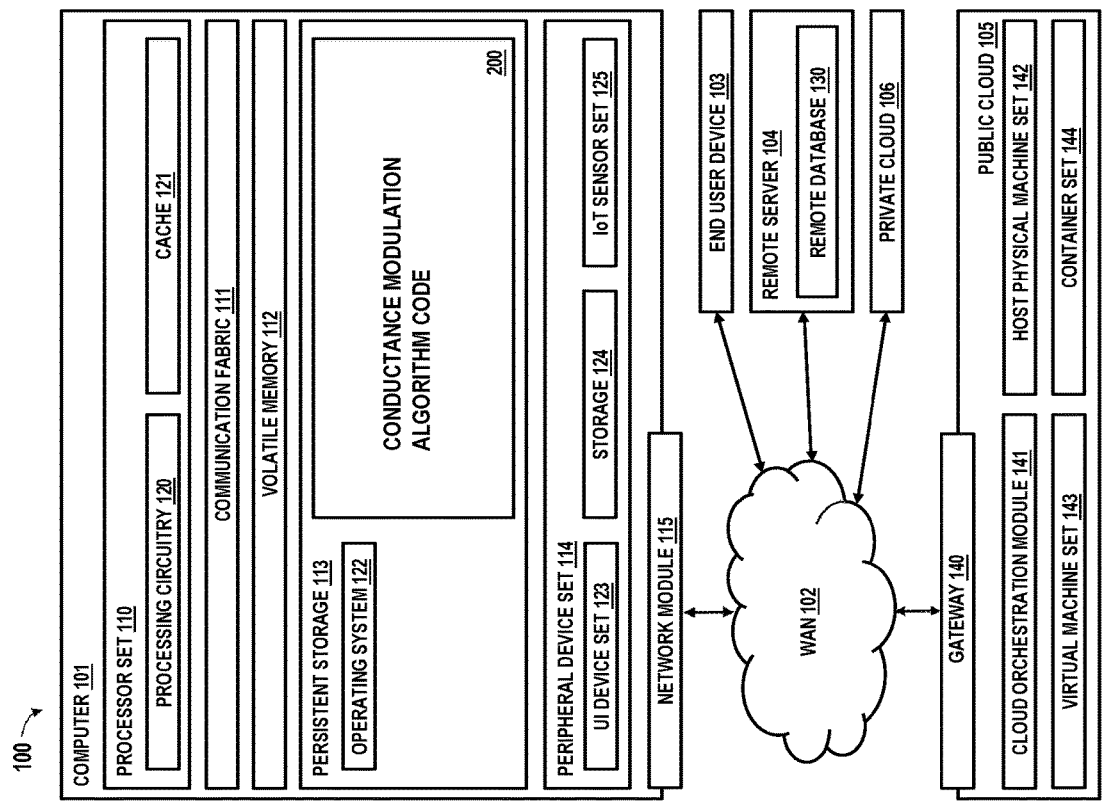
FIG. 1 illustrates an example computer or processing system or environment that may implement a system for conductance modulation in computational memory in one embodiment.

According to an aspect of the invention, there is provided a method for operating analog memory devices. The method can include determining a plurality of conductance values for a plurality of unit cells arranged in a crossbar arrangement. The plurality of unit cells can include non-volatile memory (NVM) devices, and the plurality of conductance values can be less than maximum conductance values of the plurality of unit cells. The method can further include determining a read gate voltage for driving a plurality of access transistors to read from the plurality of unit cells. The method can further include mapping a plurality of weights to the plurality of conductance values and to the read gate voltage.

Advantageously, the method in an aspect can reduce the maximum conductance of unit cells in analog memory devices and the reduced maximum conductance of the unit calls can improve the computational precision of the analog memory devices.

One or more of the following aspects or features can be separable or optional from each other in one or more embodiments.

In another aspect, a plurality of calibration weights can be mapped to the plurality of unit cells. The determination of the plurality of conductance values can include setting the read gate voltage to an initial value, using the initial value of the read gate voltage to perform a read operation on the plurality of unit cells, determining a conductance distribution of the plurality of unit cells based on a result of the read operation, and determining the plurality of conductance values using the conductance distribution. The conductance distribution can be used for optimizing the read gate voltage that can be used for mapping the plurality of weights.

Yet in another aspect, the determination of the plurality of conductance values using the conductance distribution can include specifying a conductance value that is greater than conductance values of a portion of the plurality of unit cells and setting the specified conductance value as one of the plurality of conductance values. The specification of conductance value using the conductance distribution can be used for optimizing the read gate voltage that can be used for mapping the plurality of weights.

Yet in another aspect, the determination of the read gate voltage can include using the plurality of conductance values to perform a programming operation to map a plurality of calibration weights to the plurality unit cells, using an initial value of the read gate voltage to perform a read operation on the plurality of unit cells, determining an error of a result of the read operation and using the error to adjust the read gate voltage. The performance of the programming operation using the plurality of conductance values and using the initial value of the read gate voltage to read the plurality of unit cells can provide error observations that are dependent on the plurality of conductance values, and the error observations can be used for optimizing the read gate voltage that can be used for mapping the plurality of weights.

Yet in another aspect, the determination of the read gate voltage can include using the plurality of conductance values to perform a programming operation to map a plurality of calibration weights to the plurality unit cells, using a specific value of the read gate voltage to perform a read operation on the plurality of unit cells, determining an error of a result of the read operation, determining a difference between the error and a previous error, where the previous error is from a previous iteration of read operation on the plurality of unit cells mapped to the calibration weights using previously determined values of the plurality of conductance values and using the difference to adjust the read gate voltage. The difference between consecutive errors, such as the error and a previous error, can be used for optimizing the read gate voltage that can be used for mapping the plurality of weights.

Yet in another aspect, using the difference to adjust the read gate voltage can include, in response to the difference indicating the error is equal to or greater than the previous error, setting the specific value of the read gate voltage as the read gate voltage and in response to the difference indicating the error is less than the previous error, reducing the read gate voltage to a new value. The difference between consecutive errors, such as the error and a previous error, can be used for tuning the read gate voltage to an optimized value that can be used for mapping the plurality of weights.

Yet in another aspect, the method can further include using the plurality of conductance values to perform a programming operation to map a plurality of calibration weights to the plurality unit cells, using a plurality of candidate values of the read gate voltage to perform a plurality of read operations on the plurality of unit cells, identifying a specific value among the candidate values of the read gate voltage that causes a result of the read operation to have the lowest compute error, and determining the specific value as an optimal value of the read gate voltage. The determination of the optimal value of the read gate voltage using the lowest compute error can optimize the read gate voltage.

A system that includes at least a memory device and a controller can be provided, where the controller can be configured to perform one or more aspects of the methods described herein.

A computer program product that includes a computer readable storage medium having program instructions embodied therewith, the program instructions readable by a device to cause the device to perform at least one or more aspect of the methods described above can be provided.

An example technical use case of the methods, systems, and computer program products described herein includes machine learning (ML) applications. Machine learning models, such as artificial neural networks, can use the methods, systems, and computer program products described herein to map weights to combinations of conductance values and read gate voltage in analog memory devices. The mapping of weights to combinations of conductance values and read gate voltage in the analog memory devices can improve computation precision of ML-related operations being performed by the analog memory devices.

The methods, systems, and computer program products described herein can map weights to combinations of conductance values and read gate voltage in the analog memory devices such that read operations on the analog memory devices can be performed with reduced read conductance. The reduced read conductance can improve noise and computation precision.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following descriptions, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

An analog memory device (or an analog in-memory core (AIMC)) can include a plurality of unit cells including one or more conductive devices. These conductive devices, when arranged in a crossbar arrangement, can be used to perform multiply-accumulate (MAC) and vector-matrix multiplication (VMM) operations in as little as order O(1). This can be accomplished by encoding inputs as either analog voltages or pulse width modulation (PWM) pulses, and encoding parameters (e.g., weights) using the conductance state of devices. Using Ohm's law, current I is a product of voltage V and conductance G (e.g., I=V×G), the current summed in each crossbar column represents one element of the resulting multiplication vector of size N. Analog memory devices can be used in various applications, such as machine learning model training and inference in machine learning applications. Parameters of machine learning models, such as weights, can be mapped linearly between high or maximum conductive ($G_{max}$) state and low or minimum conductive ($G_{min}$) state of the conductive devices.

In an aspect, analog memory devices can be computational memristive devices, such as unit cells composed by phase change material. Phase change materials can change phase between an amorphous state and a crystalline state by application of specific levels of electrical current or voltage. The amorphous state can be characterized by a relatively higher electrical resistivity than the crystalline state, causing different levels of voltages or current being used for setting the phase of the phase change material. A phase change memory (PCM) device can use phase change material to increase memory capacity. In an aspect, different voltage or current levels can be applied to alter the phase change material such that the PCM device can vary among an OFF or RESET state (e.g., fully amorphous), an ON or SET state (e.g., fully crystalline), and intermediate states that represent different degrees of partial crystallization. Thus, PCM devices can be capable of storing more than two bits of information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates an example computer or processing system or environment that may implement a system for conductance modulation in computational memory in one embodiment. As shown in FIG. 1, computing environment 100 can include an example of an environment for the execution of at least some of the computer code involved in performing the inventive methods described herein, such as a conductance modulation algorithm code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2A:
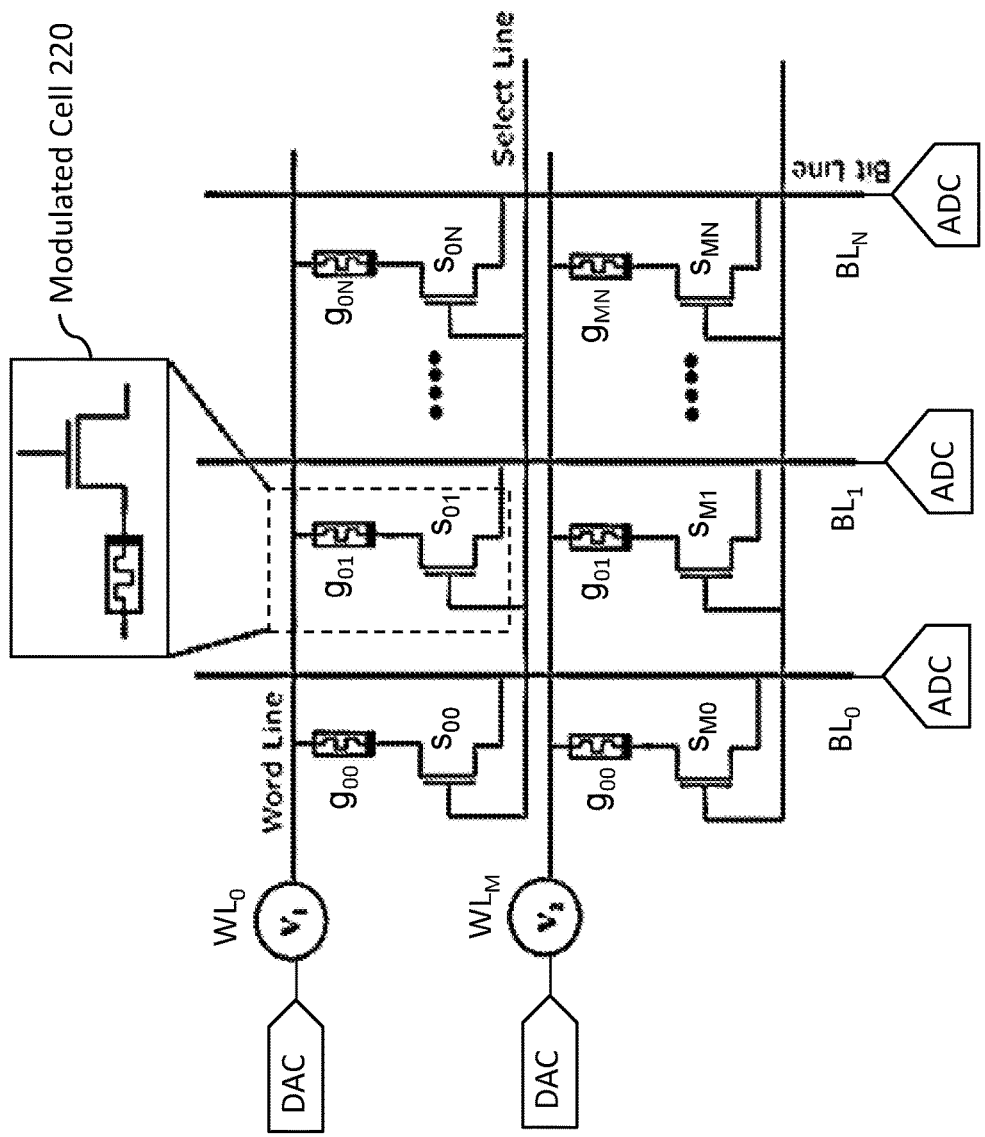
FIG. 2A is a diagram illustrating an example analog memory device in one embodiment.
Figure 2B:
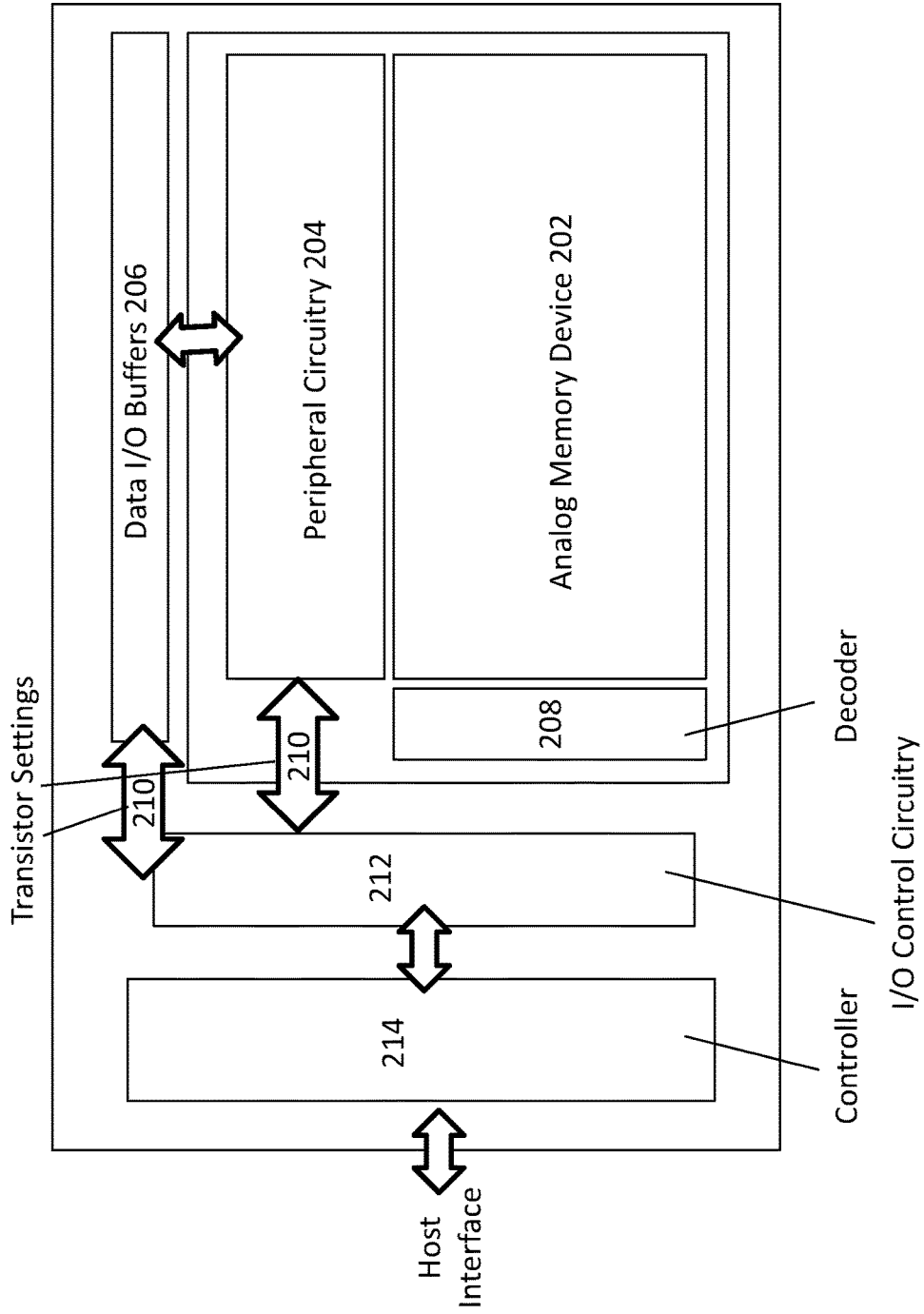
FIG. 2B is a diagram illustrating an example system for implementing conductance modulation in computational memory in one embodiment.

FIG. 2A is a diagram illustrating an example analog memory device in one embodiment. An analog memory device 202 can communicate with one or more digital processors to facilitate operations or functions of analog memory device 202. Referring to FIG. 2B, peripheral circuitry 204 can interface and communicate with conductive devices, such as the unit cells shown in FIG. 2A, in analog memory device 202. Peripheral circuitry 204 can include electronic hardware such as digital-to-analog converters (DACs) and analog-to-digital converters (ADCs), as shown in FIG. 2A. The DACs in periphery circuitry 204 can be used for encoding inputs as voltages, and the ADCs in periphery circuitry can be used for converting output analog signals resulting from computations performed by analog memory device 202 into digital signals.

As shown in FIG. 2A, a plurality of unit cells including one or more conductive devices with conductance $g_{00}, \ldots, g_{MN}$ can be arranged in a crossbar array having M rows of write lines $WL_0, \ldots, WL_M$ and N columns of bit lines $BL_0, \ldots, BL_N$. The unit cells can be arranged at cross points of the crossbar array. The unit cells in analog memory device 202 can be, for example, resistive RAM (ReRAM), conductive-bridging RAM (CBRAM), NOR flash, magnetic RAM (MRAM), and phase-change memory (PCM). Multiple access transistors $s_{00}, \ldots, s_{MN}$, attached in series with the unit cells, can be used for accessing the unit cells. Access transistors can act as on/off switches to enable the selection of a specific memory cell for data retrieval or modification. In machine learning applications, the unit cells can be programmed to store and encode synaptic weights values of an artificial neural network (ANN).

The conductance values $g_{00}, \ldots, g_{MN}$ can encode or map a plurality of weights, represented as a matrix W, of a trained machine learning model (e.g., a trained neural network). In an aspect, a conductance $g_{ij}$ can be expressed as $$g_{ij} = w_{ij}\left(\frac{G\max}{W\max}\right),$$

where $g_{ij}$ denotes a mapped conductance value of a conductive device at an i-th row and j-th column, $w_{ij}$ denotes the parameter or weight value to be mapped to the conductive device at an i-th row and j-th column, Gmax denotes a maximum conductance value defined for the crossbar array and Wmax is the maximum weight value to be mapped. A conductance range for encoding the parameters $w_{ij}$ can be defined as the range of values of goo between the high conductive state Gmax and the low conductive state Gmin. The value of Gmin can be zero or a predefined value that can be relatively small.

In an aspect, a key parameter governing the performance of computing cores that utilize analog or computational memory devices, including PCM devices, can be the absolute value of the conductance in the SET low resistance state (LRS) of the computational memory devices. When the SET conductance values are large, i.e. determined by the phase change material properties, the energy dissipation increases from higher currents along the bit lines. When the SET conductance is large, the IR drops in the crossbar also increases, resulting in noise and causing computational imprecision in outlier devices. Therefore, it may be desirable to achieve small conductance in the SET state of the devices when reading from the crossbar to improve the overall compute precision.

In computational memristive devices, such as PCM devices, the conductance of the unit cells can be mapped into the nonvolatile state configuration and the access transistors device are used as an on/off switch. When a PCM device is being programmed (e.g., in a write or program state), the access transistor acts an on/off as switch and it can be turned on to provide large currents. When the PCM device is being read (e.g., a matrix-vector-multiplication (MVM) read), the access transistor operates in the linear or triode region and hence, can act as resistor. The resistance being provided by the access transistors can reduce the maximum conductance of the unit cells. As a gate voltage for driving the access transistor decreases, the total resistance of the channel increases. Therefore, it can be seen that the SET conductance of the unit cell can be modulated with changes in the transistor setting (e.g., changes to the gate voltage), and this effect may be negligible in the RESET state of the memory devices.

In an aspect, changes in the gate voltage for driving the access transistors can change the conductance of the unit cell, and the conductance changes can also change the voltage drop over the unit cell. To achieve the same unit cell current using a lower gate voltage, the PCM device can be programmed to a higher conductance since a larger fraction of the read voltage drops over the transistor. However, when reading high conductance from the PCM device, the high voltage drop can create noise and can cause computational imprecision.

To be described in more detail below, to reduce the maximum conductance $G_{max}$ of the unit-cell by decreasing the gate voltage $V_{gate}$ and simultaneously improve the computational precision, the conductance of the unit cells can be mapped to a combination of the access transistor and the unit cell, where the combination is labeled as a modulated cell 220 in FIG. 2A. When the unit cell is being read, the access transistor functions as a reconfigurable resistor such that the resistance being provide by the access transistor (which will be operating in the linear or triode region) can be adjusted by adjusting its gate voltage $V_{gate}$. If $V_{gate}$ is being adjusted to, for example, increase the resistance provided by the access transistor, then the maximum conductance being read in a read operation can be reduced, thus improving noise and computational precision.

Referring to an example system 201 shown in FIG. 2B, system 201 can be configured to determine a conductance distribution $G_{max}(V_{gate})$ of the analog memory device 202, determine an optimized value of $V_{gate}$ based on the conductance distribution, and perform an iterative programming and an assessment of the compute accuracy that can be achieved using the optimized value of $V_{gate}$.

System 201 can include analog memory device 202 and peripheral circuitry 204. System 201 can further include data input/output (I/O) buffers 206, a decoder 208, I/O control circuitry 212 and a controller 214. Controller 214 can be, for example, microcontrollers including hardware components, such as processors, logic circuits, digital to analog converters (DACs), comparators, mixers, memory devices (e.g., registers), and various electronic hardware components. Controller 214 can be configured to control operations of various portions of system 201, such as peripheral circuitry 204, data I/O buffers 206, decoder 208 and I/O control circuitry 212. Peripheral circuitry 204, data I/O buffers 206 and I/O control circuitry 212 can exchange transistor settings 210 that can include various information and data relating to analog memory 202, such as gate voltages for driving the access transistors and selection of unit cells for read and write (or programming) operations to be performed in analog memory device 202. Controller 214 can analyze the transistor settings 210 and adjust transistor settings 210 optimize performance of analog memory device 202.

Figure 3A:
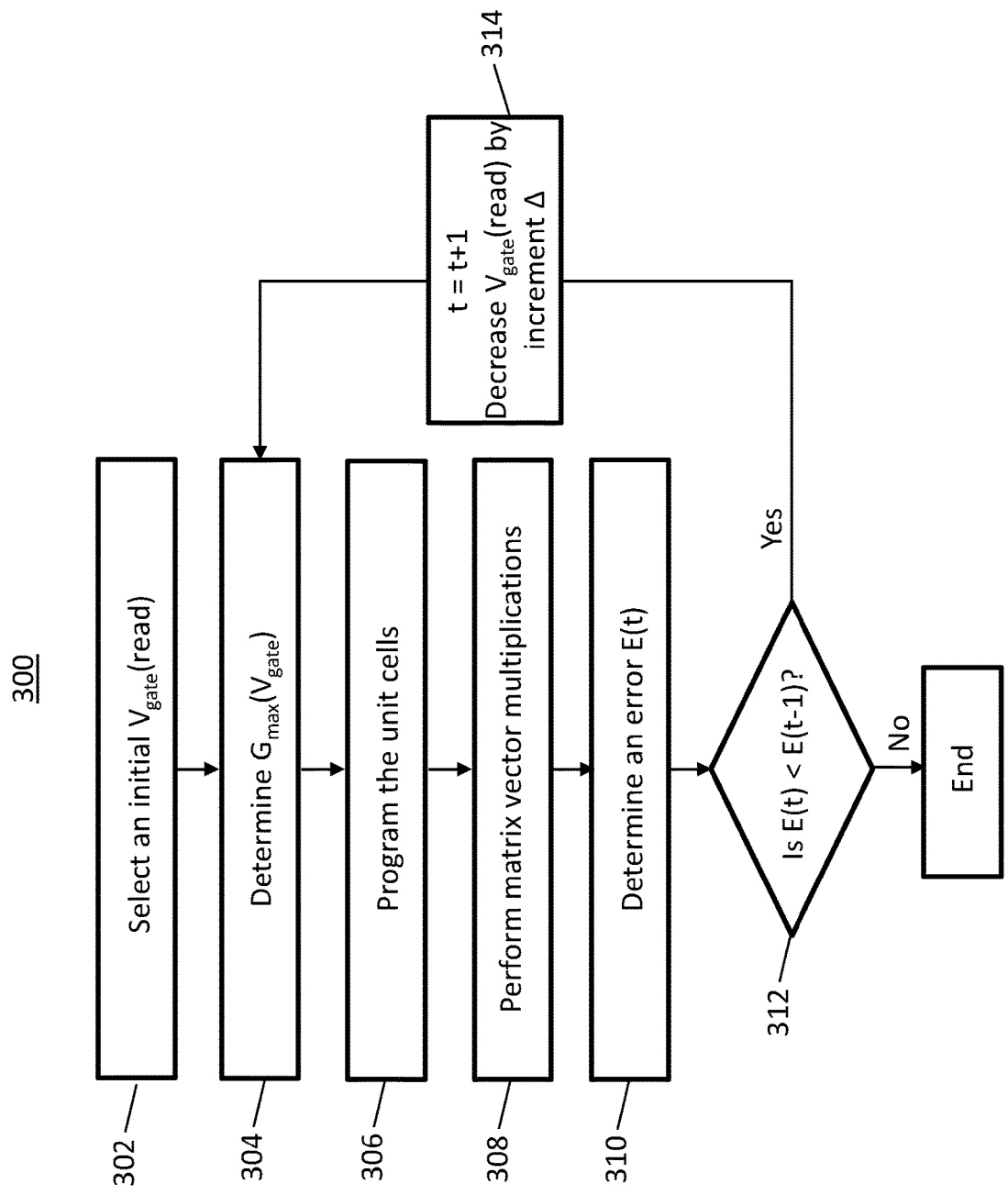
FIG. 3A is a diagram illustrating process for conductance modulation in computational memory in one embodiment.

FIG. 3A is a diagram illustrating a process for conductance modulation in computational memory in one embodiment. Descriptions of FIG. 3A may reference components that are shown in FIG. 1 to FIG. 2B. A process 300 is shown in FIG. 3A, where process 300 can be performed by system 100 and/or system 200 shown in FIG. 1 and FIG. 2B.

Process 300 can include one or more operations, actions, or functions as illustrated by one or more of blocks 302, 304, 306, 308, 310 and/or 312. Although illustrated as discrete blocks, various blocks may be divided into additional blocks, combined into fewer blocks, eliminated, performed in different order, or performed in parallel, depending on the desired implementation.

Figure 3B:
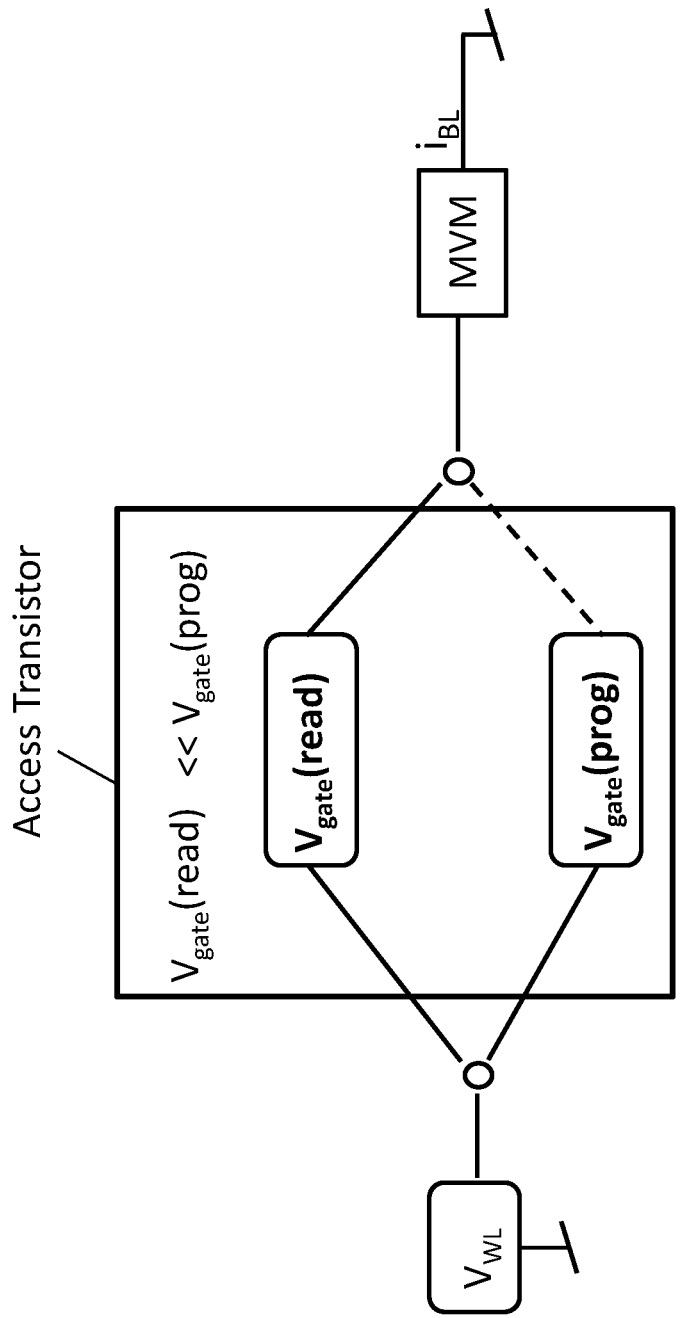
FIG. 3B is a diagram illustrating example usage of programming and read gate voltages in one embodiment.

Process 300 can begin at block 302. At block 302, a processor or controller (e.g., controller 204) can set or select an initial value of gate voltage $V_{gate}(read)$, where $V_{gate}(read)$ can be a voltage for driving an access transistor for a reading operation. Referring to an example shown in FIG. 3B, $V_{gate}(read)$ can be significantly less than a gate voltage for driving the access transistor for a programming or write operation. A voltage on a write line, labeled as $V_{WL}$, can be provided to a gate terminal of an access transistor. If V is $V_{gate}(prog)$, then the access transistor can be fully turned on to facilitate writing to a unit cell connected to the access transistor. If $V_{WL}$ is $V_{gate}(read)$, then the access transistor can operate in the linear or triode region and a conductance of the unit cell can be read as a result of a MVM operation, resulting in output of a bit line current $i_{BL}$. In one embodiment, at block 302, the initial value of $V_{gate}$ can be set to a voltage lower than a maximum of $V_{gate}(read)$ that can be applied to the access transistor.

Figure 4A:
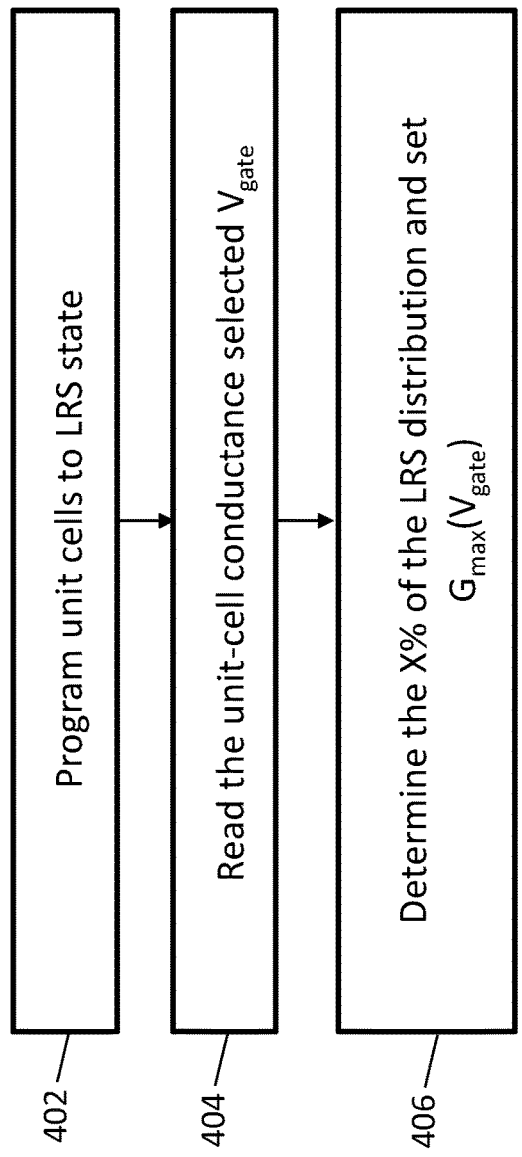
FIG. 4A is a diagram illustrating a subprocess of the process shown in FIG. 3A in one embodiment.
Figure 4B:
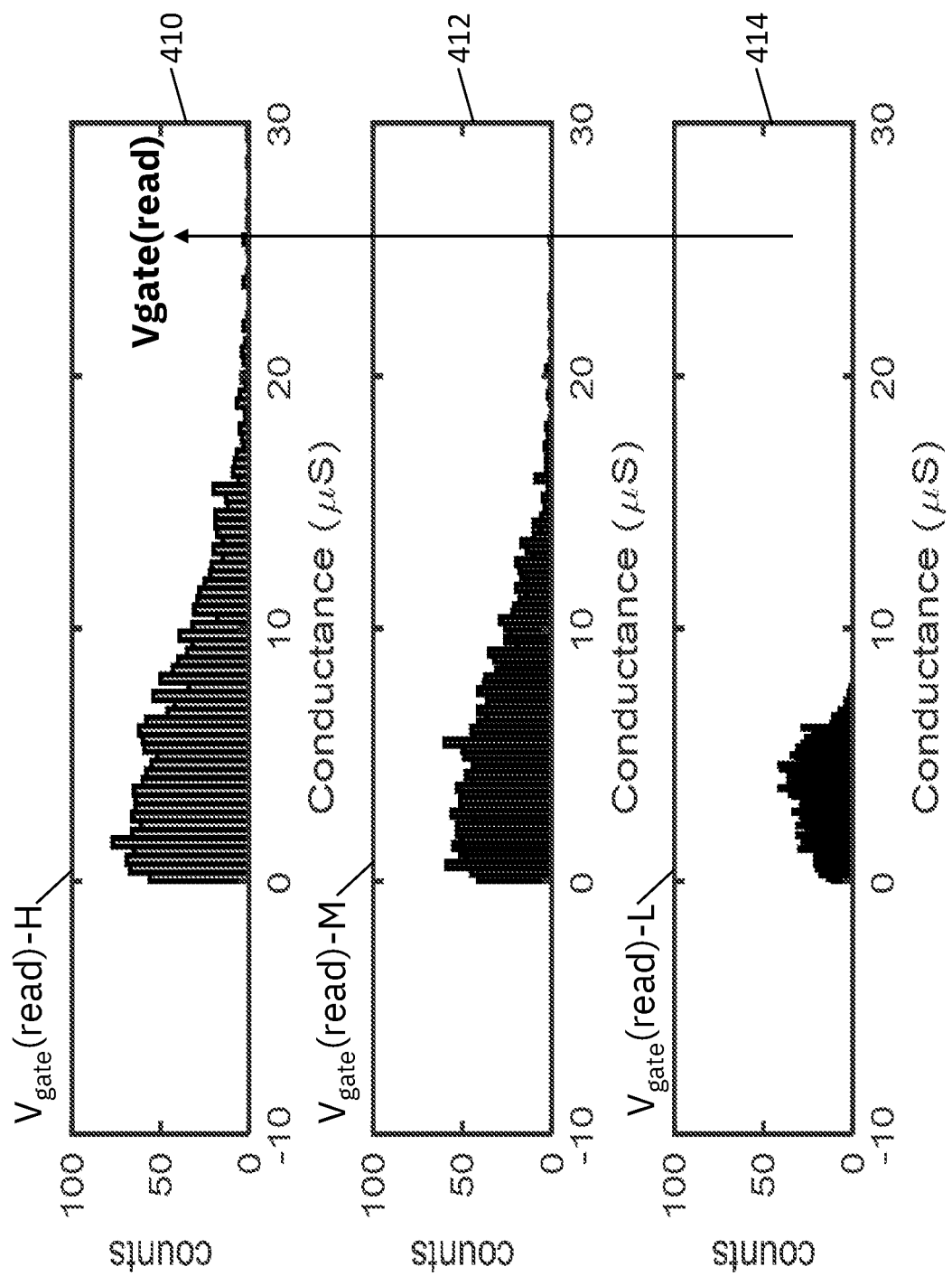
FIG. 4B is a diagram illustrating a set of conductance distributions in one embodiment.

Process 300 can proceed from block 302 to block 304. At block 304, controller 214 can determine a conductance distribution $G_{max}(V_{gate})$. The conductance distribution $G_{max}(V_{gate})$ can be a distribution showing a distribution of conductance of a portion of unit cells in analog memory device 202. Details of the determination of conductance distribution $G_{max}(V_{gate})$ are shown in FIG. 4A and FIG. 4B.

Process 300 can proceed from block 304 to block 306. At block 306, controller 214 can apply programming voltage $V_{gate}(prog)$ to turn on the access transistors to perform a programming operation. In one embodiment, conductance distribution $G_{max}(V_{gate})$ outputted from block 304 can be a different conductance distribution that was already being used for mapping a plurality of known or calibration weights prior to block 306 (see description of FIG. 4 below). Controller 102 can use the conductance distribution $G_{max}(V_{gate})$ outputted from block 304 to map the calibration weights. Controller 214 can perform the programming operation to map the calibration weights to the conductance distribution $G_{max}(V_{gate})$ outputted from block 304. In one embodiment, the programming operation being performed at block 306 can be an iterative programming operation, which will be described in more detail in FIG. 5.

Process 300 can proceed from block 306 to block 308. At block 308, controller 214 can perform an MVM, by applying a plurality of inputs on the write lines, and perform a read operation using the read gate voltage $V_{gate}(read)$ selected in block 302. The read operation can cause analog memory device 202 to output currents indicating a result of the MVM. Since at block 306, the plurality of weights were mapped to the identified portion of conductance values from block 304, the current being outputted by analog memory device 202 can be reduced when compared to scenarios where the weights are mapped to default maximum conductance values.

Process 300 can proceed from block 308 to block 310. At block 310, controller 214 can determine an error E(t), where t denotes a current iteration of process 300. In one embodiment, the error E(t) can be expressed as $\|y_{ideal} - y_{exp}\|_2 / \|y_{ideal}\|_2$, where $y_{ideal}$ is floating point precision result of the MVM performed at block 308 and $y_{exp}$ is the result of the MVM performed at block 308 at iteration t. In an aspect, this expression can denote a maximal tolerable compute error obtained from simulations of the network associated with the mapped weights and can be used as a reference to maximize the power efficiency while retaining the minimal required compute accuracy of analog memory device 202.

Process 300 can proceed from block 310 to block 312. At block 312, controller 214 can compare E(t) determined at block 310 with an error from a previous iteration of process 300, labeled as E(t−1). If t=0, then process 300 can automatically proceed to block 314. If E(t) is greater than or equal to E(t−1), then process 300 can end. If E(t) is less than E(t−1), then process 300 can proceed to block 314.

Figure 7:
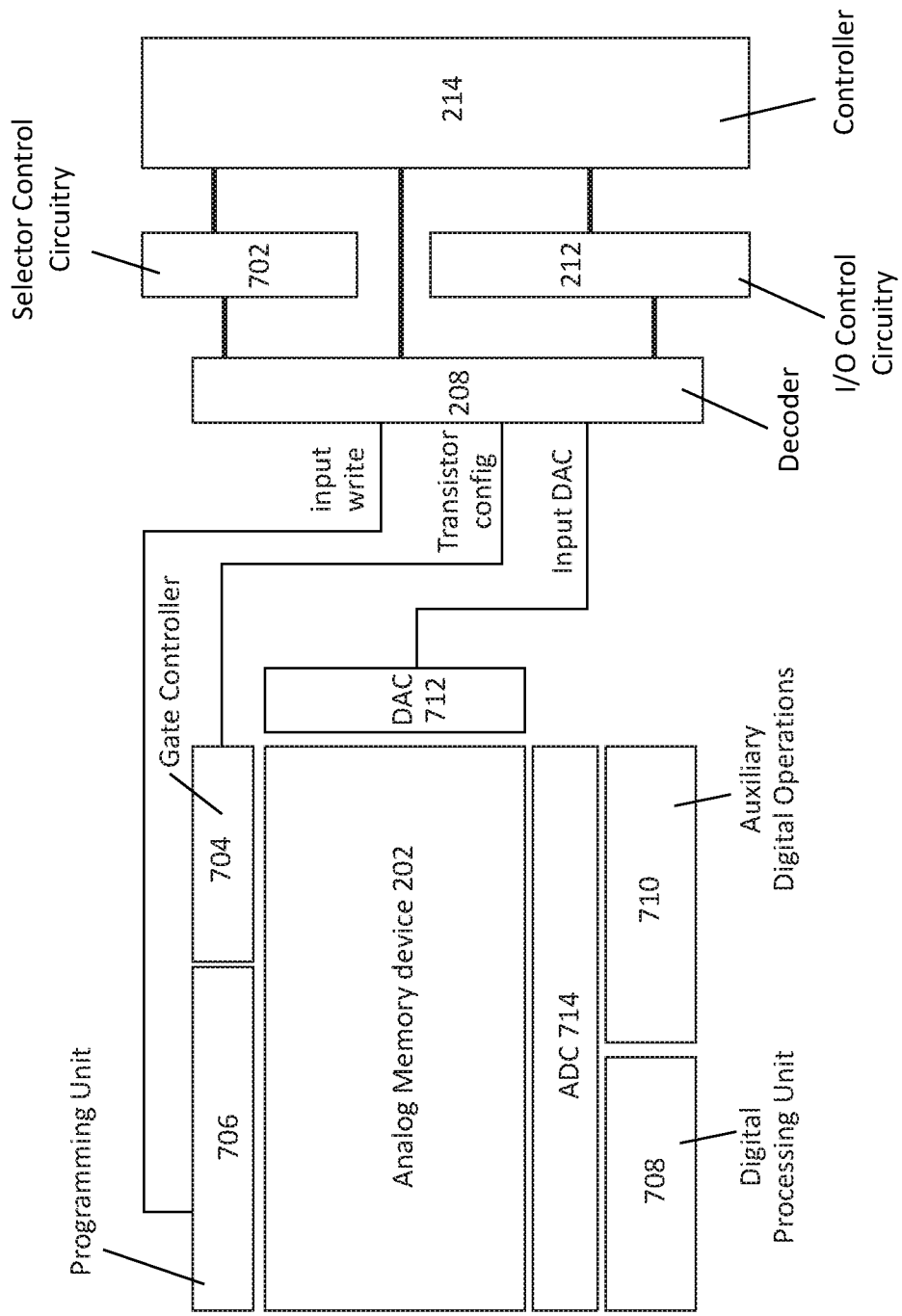
FIG. 7 is a diagram illustrating details of a system for implementing conductance modulation in computational memory in one embodiment.

At block 314, controller 214 can increment iteration index t by 1 and can decrease Vgate(read) by a predefined voltage increment Δ. The predefined voltage increment A can be arbitrary and dependent on a desired implementation of system 201. Process 300 can return to block 304 from block 314, and the adjusted value of $V_{gate}$(read) can be used in block 304. Process 300 can repeat blocks 304, 306, 308, 310, 312 and 314 repeatedly until E(t) remains unchanged, or is equal or greater than E(t−1). The repetition of blocks 304, 306, 308, 310, 312 and 314 can be a loop optimization being performed to decrease $V_{gate}$(read), which decreases conductance values of the unit cells in the SET state and other intermediate states. Further, this loop optimization can be implemented using hardware, as shown in FIG. 7 below.

In one embodiment, when process 300 is being performed for edge applications with error tolerant networks, it may be desirable to minimize the power consumption as much as possible. In this case, $V_{gate}$ for driving access transistors can be reduced to below the point of highest compute accuracy. The maximal tolerable compute error $\|y_{ideal}-y_{exp}\|_2/\|y_{ideal}\|_2$ obtained from simulations of the error tolerant network can be used as a reference in block 314 to maximize the power efficiency while retaining the minimal required compute accuracy. The double vertical bar symbol "||" denote norms, which measure the size or length of enclosed vectors.

At end of process 300, the most recent updated $V_{gate}$(read) value set at block 314 and the most recent identified portion of $G_{max}(V_{gate})$ in block 304 can be set as the conductance and gate voltage for mapping arbitrary weights to analog memory device 202. Therefore, each weight can be mapped to a $G_{max}$ value among $G_{max}(V_{gate})$ and to $V_{gate}$(read), effectively mapping the weight to modulated cell in FIG. 2A, where modulated cell is a combination of a unit cell and an access transistor connected in series.

FIG. 4A is a diagram illustrating a subprocess of the process shown in FIG. 3A in one embodiment. Descriptions of FIG. 4A may reference components that are shown in FIG. 1 to FIG. 3. A process 400 is shown in FIG. 4A, where process 400 can be performed by system 100 and/or system 200 shown in FIG. 1 and FIG. 2B. Process 400 can include one or more operations, actions, or functions as illustrated by one or more of blocks 402, 404, and/or 406. Although illustrated as discrete blocks, various blocks may be divided into additional blocks, combined into fewer blocks, eliminated, performed in different order, or performed in parallel, depending on the desired implementation.

Process 400, which is a subprocess of process 300 in FIG. 3A, can begin at block 402. At block 402, controller 214 can program the unit cells in analog memory device 202 to SET state or LRS state. Process 400 can proceed from block 402 to block 404. At block 404, controller 214 can perform a read operation using the read voltage $V_{gate}$(read) selected at block 302 of process 300. The read operation at block 404 can be performed for individual memory cells such that a conductance distribution, which is a distribution of maximum conductance values of the individual unit cells, can be generated. In one embodiment, unit cells in analog memory device 202 is mapped with a known (e.g., calibration) distribution of weights, such that the read operation can output conductance values that are already used for mapping the calibration weights.

Referring to FIG. 4B, conductance distributions 410, 412, 414, at different values of $V_{gate}$(read), showing conductance being used for mapping the calibration weights in a single column of unit cells in analog memory device 202 are shown. Conductance distributions 410, 412 414 can correspond to the same number of unit cells, in the single column, being read by read gate voltages $V_{gate}$(read)-H, $V_{gate}$(read)-M and $V_{gate}$(read)-L, respectively. Among the three gate voltages $V_{gate}$(read)-H, $V_{gate}$(read)-M and $V_{gate}$(read)-L, $V_{gate}$(read)-H is the highest gate voltage, $V_{gate}$(read)-L is the lowest gate voltage and $V_{gate}$(read)-M is between $V_{gate}$(read)-H and $V_{gate}$(read)-L. From the conductance distributions shown in FIG. 4B, as $V_{gate}$(read) decreases, the range of conductance values for mapping the calibration weights also decreases. The reduction of $V_{gate}$(read) can increase resistance of the unit cell and reduce conductance under read operations to improve noise and precision.

Figure 4C:
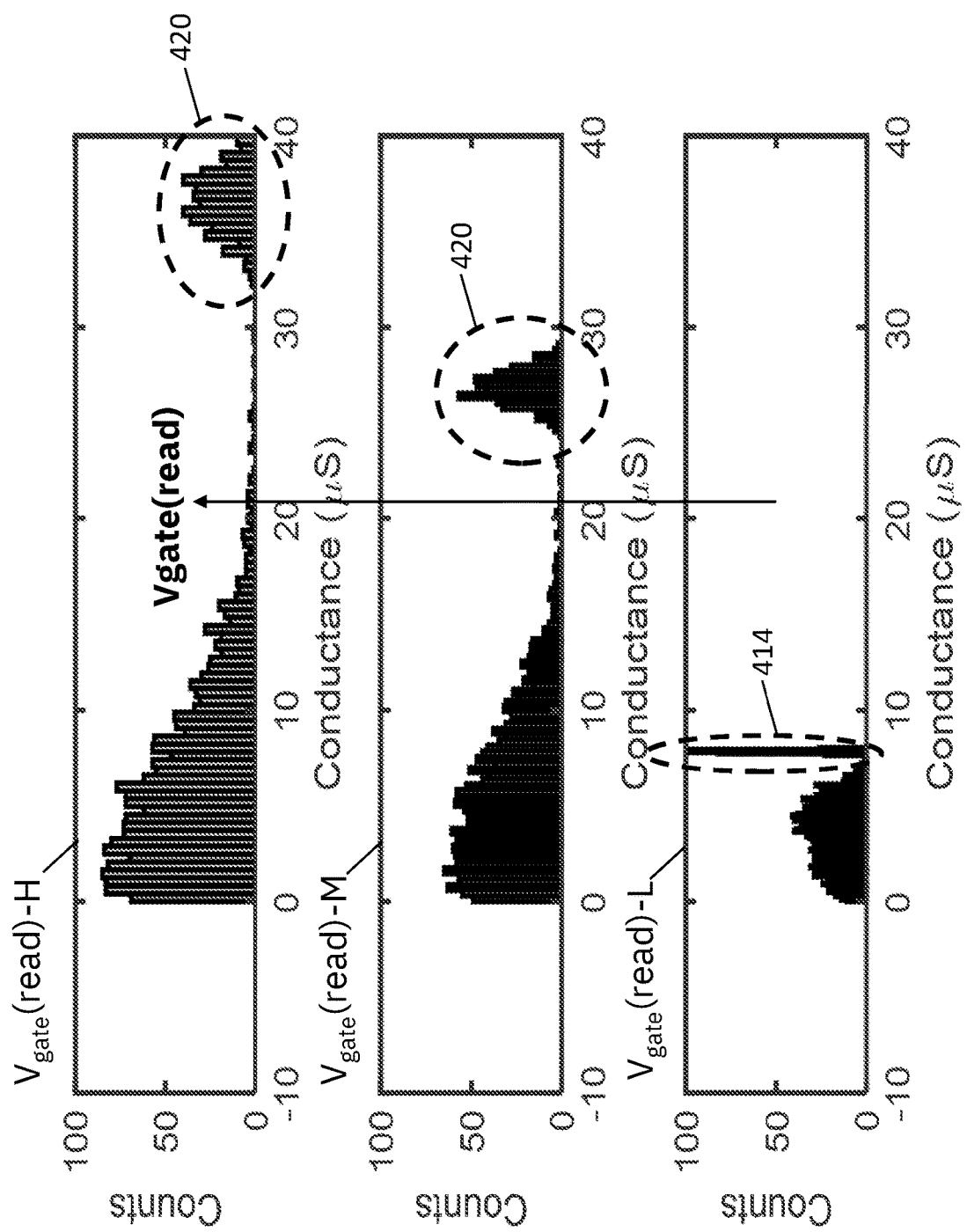
FIG. 4C is a diagram illustrating another set of conductance distributions in one embodiment.

Referring to FIG. 4C, conductance distributions 410, 412, 414 with the addition of outlier weights 420. Outlier weights 420 can be weights being mapped to unit cells that are in high conductance state, and this outlier high conductance state can be caused by dominance of outlier weights 420 in MAC operations. As shown in FIG. 4C, using a lower $V_{gate}$(read) can reduce the impact of outlier weights 420 on MAC operations.

Returning to FIG. 4A, block 404 can output a conductance distribution similar to those shown in FIG. 4B and FIG. 4C. Process 400 can proceed from block 404 to block 406. At block 406, controller 214 can specify a conductance value, $G_{max}$ for which X % of unit cells have lower conductance, and the rest of the unit cells have greater conductance than the specified $G_{max}$. The value of X can be predefined. By way of example, for a specific Vgate, if there are 2,048 unit cells, then a conductance distribution (e.g., in FIGS. 4A and 4B) can include 2,048 samples. If X % is 5% (and where 5% of 2,048 unit cells is approximately 102 unit cells), then a $G_{max}$ value at the 102-nd point on an x-axis of the conductance distribution can be identified and this identified $G_{max}$ can be specified for the specific $V_{gate}$. The specification of $G_{max}$ can be repeated for different values of $V_{gate}$ since $G_{max}$ is the parameter that is being used in mapping the weights for performing the MVM operation. The different values of $G_{max}$ specified for different values of $V_{gate}$ can be used to derive a conductance distribution $G_{max}(V_{gate})$ that can be used for the programming operation in block 306 of process 300. The calibration weights being mapped in block 306 of process 300 can be identical to the calibration weights that were already mapped to all unit cells in block 402 of process 400.

Figure 5:
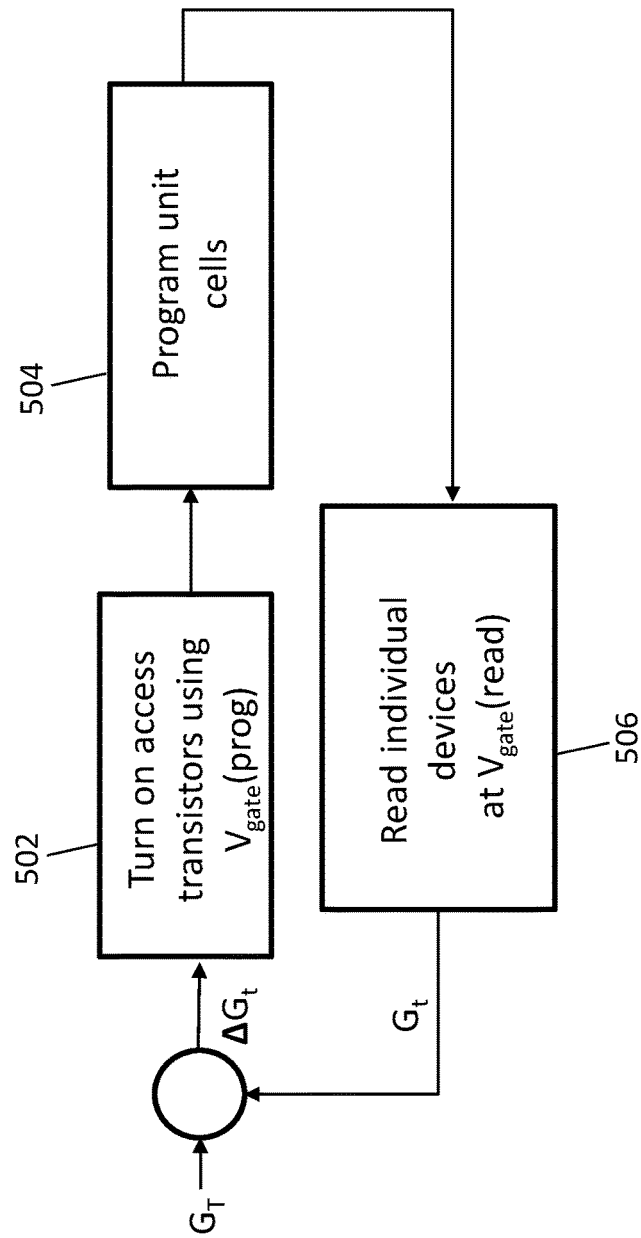
FIG. 5 is a diagram illustrating another subprocess of the process shown in FIG. 3A in one embodiment.

FIG. 5 is a diagram illustrating another subprocess of the process shown in FIG. 3A in one embodiment. Descriptions of FIG. 5 may reference components that are shown in FIG. 1 to FIG. 4C. A process 500 is shown in FIG. 5, where process 500 can be performed by system 100 and/or system 200 shown in FIG. 1 and FIG. 2B. Process 500 can include one or more operations, actions, or functions as illustrated by one or more of blocks 502, 504, and/or 506. Although illustrated as discrete blocks, various blocks may be divided into additional blocks, combined into fewer blocks, eliminated, performed in different order, or performed in parallel, depending on the desired implementation.

Process 500, which is a subprocess of process 300 in FIG. 3A, can be an iterative programming scheme. Process 500 can begin at block 502. At block 502, controller 214 can set gate voltage for driving access transistors in analog memory device 202 to $V_{gate}$(prog). Process 500 can proceed from block 502 to block 504. At block 504, controller 502, in response to setting $V_{gate}$(prog) to drive the access transistors, controller 102 can use the conductance distribution $G_{max}(V_{gate})$ outputted from block 304 to individually map the calibration weights to unit cells in analog memory device 202. For each weight and each unit cell, controller 214 can apply a programming pulse GT representing a conductance value among the conductance distribution $G_{max}(V_{gate})$.

Process 500 can proceed from block 504 to block 506. At block 504, controller 502 can set the gate voltage of the access transistor to $V_{gate}$(read) and read conductance values from individual unit cells in analog memory device 202 using read gate voltage $V_{gate}$(read). A difference $\Delta G_t$ between Gr and each conductance $G_t$ being read in block 506 can be determined, and the difference $\Delta G_t$ can be used for updating conductance values of the unit cells in analog memory device 202. Controller 214 can program analog memory device 202 by mapping the calibration weights to the updated conductance values.

Figure 6:
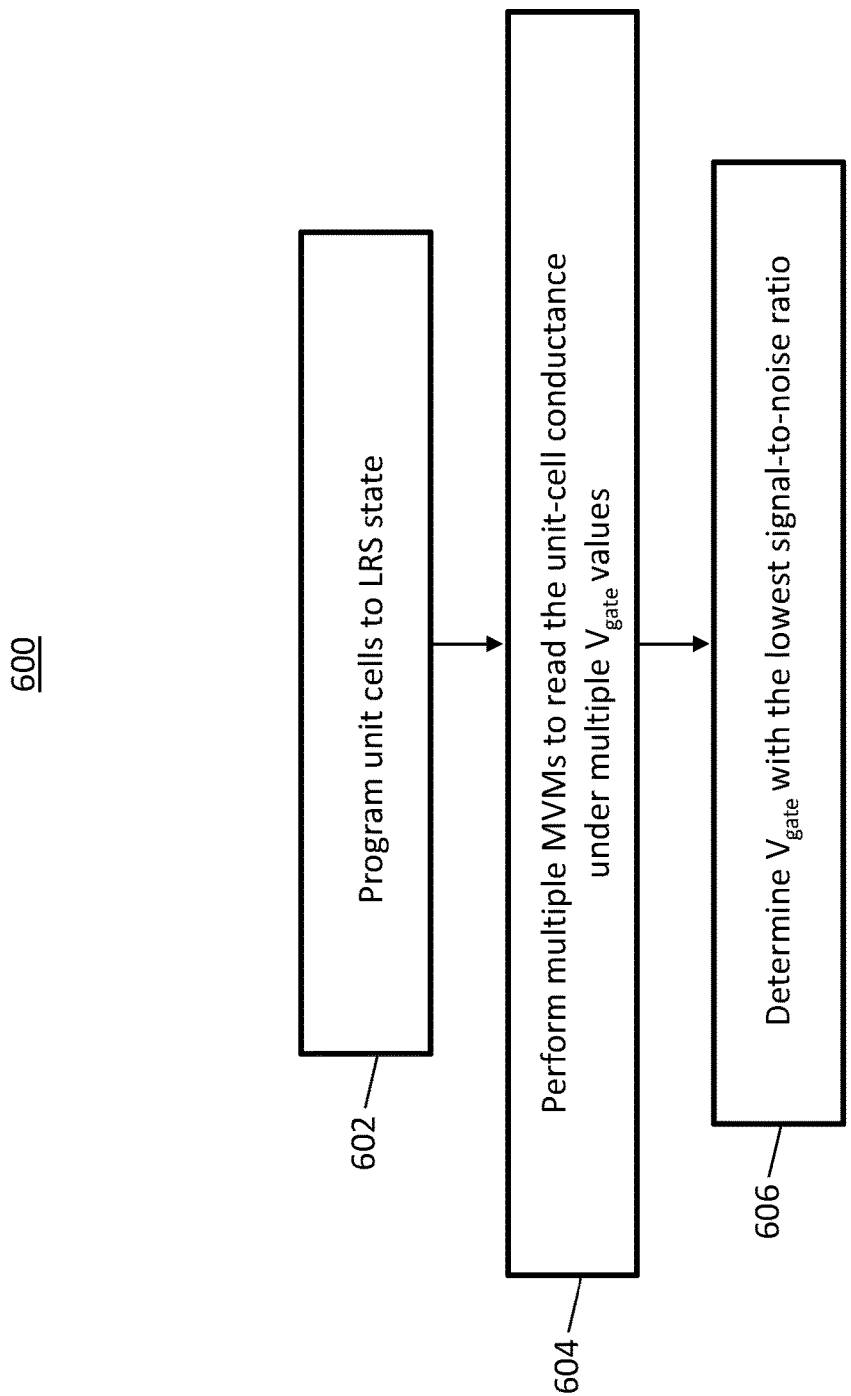
FIG. 6 is a diagram illustrating a process for optimizing access transistor gate voltage for conductance modulation in computational memory in one embodiment.

FIG. 6 is a diagram illustrating a process for optimizing access transistor gate voltage for conductance modulation in computational memory in one embodiment. Descriptions of FIG. 6 may reference components that are shown in FIG. 1 to FIG. 5. A process 600 is shown in FIG. 6, where process 600 can be performed by system 100 and/or system 200 shown in FIG. 1 and FIG. 2B. Process 600 can include one or more operations, actions, or functions as illustrated by one or more of blocks 602, 604, and/or 606. Although illustrated as discrete blocks, various blocks may be divided into additional blocks, combined into fewer blocks, eliminated, performed in different order, or performed in parallel, depending on the desired implementation.

In one embodiment, in addition to adjusting $V_{gate}$(read) based on the error E(t), process 600 can be performed to determine an optimized value of $V_{gate}$(read). Process 600 can begin at block 602. At block 602, controller 214 can program the unit cells in analog memory device 202 to SET state or LRS state. Process 600 can proceed from block 602 to block 604. At block 604, controller 214 can perform multiple MVMs using multiple candidate $V_{gate}$ values to read conductance values of the unit cells in analog memory device 202. Process 600 can proceed from block 604 to block 606. At block 606, controller 214 can determine a $V_{gate}$ value among the candidate $V_{gate}$ values used in block 604 that has the lowest compute error (e.g., E(t)), and set the determined $V_{gate}$ value as an ideal or optimized $V_{gate}$ value. In one embodiment, when the compute error (e.g., a L2 norm) is below a predefined threshold value, or when there is no change in the error E(t) between consecutive iterations, process 600 can be implemented to further optimize $V_{gate}$(read).

FIG. 7 is a diagram illustrating details of a system for implementing conductance modulation in computational memory in one embodiment. In an embodiment shown in FIG. 7, additional details of system 201 in FIG. 2B are shown. In the embodiment shown in FIG. 7, system 201 can further include a selector control circuitry 702, a gate controller 704, a programming unit 706, a digital processing unit 708, and a circuit block 710 for auxiliary digital operations. Decoder 208 can be configured to decode instructions, commands and control signals provided by one or more of controller 214, I/O control circuitry 212 and selector control circuitry 702. Instructions, commands and control signals that can be decoded and outputted by decoder 208 can include an input write command, a transistor config command, and input DAC command.

In one embodiment, selector control circuitry 702 can be configured to provide locations or positions (e.g., word line and bit line indices) of specific unit cells in analog memory device being selected for read or write operations. If selector control circuitry 702 selects specific unit cells for a write operation, the input write command decoded by decoder 208 can indicate the selected unit cells and can be provided to programming unit 706. The input write command can be for commanding programming unit 706 to configure analog memory device 202 for programming or write operation. Programming unit 706 can be configured to set the gate voltage of access transistors in analog memory device 202 to $V_{gate}$(prog). Programming unit 706 can be configured to perform programming or write operation to map weights to a combination of conductance values of unit cells and a read gate voltage (e.g., $V_{gate}$(read) determined by process 300).

Decoder 208 can output the input DAC command to a DAC 712, that can be a part of peripheral circuitry 204 in FIG. 2B, to turn on DAC 712. When DAC 712 is turned on, DAC 712 can convert digital signals (e.g., programming pulses) representing weights to be mapped to modulated cells 220 in analog memory device 202 into analog signals that can be applied to the unit cells in analog memory device 202.

Decoder 208 can output the transistor config command to gate controller 704. In one embodiment, the transistor config command can be a part of transistor setting 210 shown in FIG. 2B. In one embodiment, gate controller 704 can be an integrated circuit (IC) embedded on or integrated with a tile including analog memory device 202. Transistor config command can be a command for turning on gate controller 704. When gate controller 704 is turned on, gate controller 704 can output voltage control signals to modify read gate voltage $V_{gate}$(read) being used in a read operation on analog memory device 202. By way of example, controller 214 can perform process 300 shown in FIG. 3A to determine $V_{gate}$(read), and provide the determined $V_{gate}$(read) to decoder 208. Decoder 208 can decode the provided $V_{gate}$(read) the decoding can lead to generation of the transistor config command for turning on gate controller 704 and instructing gate controller 704 that the provided $V_{gate}$(read) is to be used for a read operation. In one embodiment, gate controller 704 can be configured to override and/or tune a previously set $V_{gate}$(read) with the $V_{gate}$(read) value provided in transistor config command (e.g., $V_{gate}$(read) determined from process 300).

In one embodiment, the auxiliary digital operations circuit block 710 can be configured to receive the output from block 308 in process 300 for determining various errors. By way of example, the auxiliary digital operations circuit block 710 can be configured to determine errors, such as E(t) and E(t−1) shown in process 300 of FIG. 3B, for chip-in-the-loop optimization of $V_{gate}$(read). In one embodiment, programming unit 706 can be turned off, and auxiliary digital operations circuit block 710 and gate controller 704 can be turned on, when system 201 performs MVM operations using analog memory device 202 mapped with known or calibration weights. The auxiliary digital operations circuit block 710 and gate controller 704 can implement a loop optimization to improve the precision of various arithmetic operations performed by analog memory device 202, such as MVM, VMM, MAC, operations, or the like.

In one embodiment, programming unit 706 and auxiliary digital operations circuit block 710 can be turned off, and gate controller 704 can be turned on, when system 201 performs a read operation to read from analog memory device 202. In one embodiment, auxiliary digital operations circuit block 710 can be turned off, and programming unit 706 and gate controller 704 can be turned on, when system 201 performs a programming operation to program analog memory device 202. Under programming operation, gate controller 704 can be set to operate in saturation mode.

As described above, using the systems and processes described herein can allow weights of a network (e.g., neural networks or other machine learning related networks) to be mapped to a defined gate voltage (e.g., gate voltage $V_{gate}$ (read) for read operation) for access transistors and reduced conductance of analog memory unit cells such as memristors and PCM devices. The mapping of weights to access transistor and gate voltage can reduce read conductance under read operation. The reduced read conductance can improve noise performance and computational precision. The improved computational precision can also lead to lower power dissipation and larger throughput. Further, The processes described herein can also be seamlessly incorporated into various programming and read-out schemes of analog memory devices.

Furthermore, the mapping of weights to modulated cell 220 can be applicable to various types of unit cells, such as PCM devices and other nonvolatile devices including resistive memories. By way of example, the mapping of weights to modulated cell 220 can be applicable to both unprojected and projected PCM devices. For projected PCM devices, a combination of the resistance of the liner and resistance provided by the access transistor (e.g., in its linear or triode region) can contribute to the resistance that reduced conductance of the unit cell. Note the resistance of the liner and the transistor can be connected in parallel thus a combination of the resistance can be a sum of the inverses of the liner resistance and the access transistor. Also, previously disregarded switching materials that may cause high conductivity in their LRS state in conventional devices can be utilized with the systems and methods described herein due to the mapping to modulated cell 220 reducing conductance of the unit cells.

FIG. 8 is a flow diagram illustrating a method of performing conductance modulation in computational memory in one embodiment. Descriptions of FIG. 8 may reference components that are shown in FIG. 1 to FIG. 7. A process 800 is shown in FIG. 8, where process 800 can be performed by system 100 and/or system 201 shown in FIG. 1, FIG. 2B or FIG. 7. Process 800 can include one or more operations, actions, or functions as illustrated by one or more of blocks 802, 804, and/or 806. Although illustrated as discrete blocks, various blocks may be divided into additional blocks, combined into fewer blocks, eliminated, performed in different order, or performed in parallel, depending on the desired implementation.

Process 800 can be performed by a processor or a controller, such as processor(s) and/or controller(s) in systems 100 and 201 described above. Process 800 can begin at block 802. At block 802, a controller can determine a plurality of conductance values for a plurality of unit cells arranged in a crossbar arrangement. The plurality of unit cells can include non-volatile memory (NVM) devices. The plurality of conductance values can be less than maximum conductance values of the plurality of unit cells.

In one embodiment, a plurality of calibration weights can be mapped to the plurality of unit cells. The determination of the plurality of conductance values can include setting the read gate voltage to an initial value. The controller can use the initial value of the read gate voltage to perform a read operation on the plurality of unit cells. The controller can determine a conductance distribution of the plurality of unit cells based on a result of the read operation. The controller can determine the plurality of conductance values using the conductance distribution.

In one embodiment, the controller can determine the plurality of conductance values using the conductance distribution by specifying a conductance value that is greater than conductance values of a portion of the plurality of unit cells and setting the specified conductance value as one of the plurality of conductance values.

Process 800 can proceed from block 802 to block 804. At block 804, the controller can determine a read gate voltage for driving a plurality of access transistors to read from the plurality of unit cells. Process 800 can proceed from block 804 to block 806. At block 806, the controller can map a plurality of weights to the plurality of conductance values and to the read gate voltage.

In one embodiment, the controller can use the plurality of conductance values to perform a programming operation to map a plurality of calibration weights to the plurality unit cells. The controller can further use an initial value of the read gate voltage to perform a read operation on the plurality of unit cells. The controller can further determine an error of a result of the read operation. The controller can further use the error to adjust the read gate voltage.

In one embodiment, the controller can use the plurality of conductance values to perform a programming operation to map a plurality of calibration weights to the plurality unit cells. The controller can use a specific value of the read gate voltage to perform a read operation on the plurality of unit cells. The controller can determine an error of a result of the read operation. The controller can determine a difference between the error and a previous error. The previous error can be from a previous iteration of read operation on the plurality of unit cells mapped to the calibration weights using previously determined values of the plurality of conductance values. The controller can use the difference to adjust the read gate voltage.

In one embodiment, the controller can, in response to the difference indicating the error is equal to or greater than the previous error, setting the specific value of the read gate voltage as the read gate voltage. The controller can, in response to the difference indicating the error is less than the previous error, reducing the read gate voltage to a new value.

In one embodiment, the controller can use the plurality of conductance values to perform a programming operation to map a plurality of calibration weights to the plurality unit cells. The controller can use a plurality of candidate values of the read gate voltage to perform a plurality of read operations on the plurality of unit cells. The controller can identify a specific value among the candidate values of the read gate voltage that causes a result of the read operation to have the lowest compute error. The controller can determine the specific value as an optimal value of the read gate voltage.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
    determining a plurality of conductance values for a plurality of unit cells arranged in a crossbar arrangement, wherein the plurality of unit cells comprises non-volatile memory (NVM) devices, and the plurality of conductance values are less than maximum conductance values of the plurality of unit cells;
    using the plurality of conductance values to perform a programming operation to map a plurality of calibration weights to the plurality unit cells;
    using an initial value of a read gate voltage to perform a read operation to read the plurality of calibration weights from the plurality of unit cells;
    determining an error of a compute result of the read operation;
    based on the determined error, adjusting the initial value of the read gate voltage to determine a read gate voltage for driving a plurality of access transistors to read from the plurality of unit cells; and
    mapping a plurality of weights to the determined plurality of conductance values and to the determined read gate voltage.

2. The method of claim 1, wherein determining the plurality of conductance values comprises:
    determining a conductance distribution of the plurality of unit cells; and
    determining the plurality of conductance values using the conductance distribution.

3. The method of claim 2, wherein determining the plurality of conductance values using the conductance distribution comprises:
    specifying a conductance value that is greater than conductance values of a predefined number of unit cells among the plurality of unit cells; and
    setting the specified conductance value as a maximum of the plurality of conductance values.

4. The method of claim 1, wherein determining the read gate voltage comprises:
    determining a difference between the error and a previous error, wherein the previous error is from a previous iteration of read operation on the plurality of unit cells mapped to the calibration weights using previously determined values of the plurality of conductance values; and
    using the difference to adjust the initial value of the read gate voltage.

5. The method of claim 4, wherein using the difference to adjust the read gate voltage comprises:
    in response to the difference indicating the error is equal to or greater than the previous error, setting the initial value of the read gate voltage as the read gate voltage; and
    in response to the difference indicating the error is less than the previous error, reducing the initial value of the read gate voltage to a new value.

6. The method of claim 1, further comprising:
    using a plurality of candidate values of the read gate voltage to perform a plurality of read operations on the plurality of unit cells;
    identifying a specific value among the candidate values of the read gate voltage that results in a read operation having the lowest compute error; and
    determining the specific value as an optimal value of the read gate voltage.

7. A system comprising:
    a memory device including:
        a plurality of unit cells arranged in a crossbar arrangement, wherein the plurality of unit cells comprises non-volatile memory (NVM) devices; and
        a plurality of access transistors connected to the plurality of unit cells;
    a controller configured to:
        determine a plurality of conductance values for the plurality of unit cells, wherein the plurality of conductance values are less than maximum conductance values of the plurality of unit cells;
        use the plurality of conductance values to perform a programming operation to map a plurality of calibration weights to the plurality unit cells;

use an initial value of a read gate voltage to perform a read operation on the plurality of unit cells;

determine an error of a compute result of the read operation;

based on the determined error, adjust the initial value of the read gate voltage to determine a read gate voltage for driving the plurality of access transistors to read from the plurality of unit cells; and map a plurality of weights to the determined plurality of conductance values and to the determined read gate voltage.

8. The system of claim 7, wherein the controller is configured to:

determine a conductance distribution of the plurality of unit cells;

determine the plurality of conductance values using the conductance distribution.

9. The system of claim 8, wherein the controller is configured to:

specify a conductance value that is greater than conductance values of a predefined number of unit cells among the plurality of unit cells; and set the specified conductance value as a maximum of the plurality of conductance values.

10. The system of claim 7, wherein the controller is configured to:

determine a difference between the error and a previous error, wherein the previous error is from a previous iteration of read operation on the plurality of unit cells mapped to the calibration weights using previously determined values of the plurality of conductance values; and use the difference to adjust the initial value of the read gate voltage.

11. The system of claim 10, wherein the controller is configured to:

in response to the difference indicating the error is equal to or greater than the previous error, set the initial value of the read gate voltage as the read gate voltage; and in response to the difference indicating the error is less than the previous error, reduce the read gate voltage to a new value.

12. The system of claim 7, wherein the controller is configured to:

use a plurality of candidate values of the read gate voltage to perform a plurality of read operations on the plurality of unit cells;

identify a specific value among the candidate values of the read gate voltage that results in a read operation having the lowest compute error; and determine the specific value as an optimal value of the read gate voltage.

13. The system of claim 7, wherein each one of the plurality of unit cells is one of an unprojected phase change memory (PCM) device and a projected PCM device.

14. A computer program product comprising a computer readable storage medium having program instructions embodied therewith, the program instructions readable by a device to cause the device to:

determine a plurality of conductance values for a plurality of unit cells arranged in a crossbar arrangement, wherein the plurality of unit cells comprises non-volatile memory (NVM) devices, and the plurality of conductance values are less than maximum conductance values of the plurality of unit cells;

use the plurality of conductance values to perform a programming operation to map a plurality of calibration weights to the plurality unit cells;

use an initial value of a read gate voltage to perform a read operation to read the plurality of calibration weights from the plurality of unit cells;

determine an error of a compute result of the read operation;

based on the determined error, adjust the initial value of the read gate voltage to determine a read gate voltage for driving a plurality of access transistors to read from the plurality of unit cells; and map a plurality of weights to the determined plurality of conductance values and to the determined read gate voltage.

15. The computer program product of claim 14, wherein the device is further caused to perform:

set the read gate voltage to an initial value;

determine a conductance distribution of the plurality of unit cells;

determine the plurality of conductance values using the conductance distribution;

specify a conductance value that is greater than conductance values of a predefined number of unit cells among the plurality of unit cells; and set the specified conductance value as a maximum of the plurality of conductance values.

16. The computer program product of claim 14, wherein the device is further caused to perform:

determine a difference between the error and a previous error, wherein the previous error is from a previous iteration of read operation on the plurality of unit cells mapped to the calibration weights using previously determined values of the plurality of conductance values; and use the difference to adjust the initial value of the read gate voltage.

17. The computer program product of claim 14, wherein the device is further caused to perform:

in response to the difference indicating the error is equal to or greater than the previous error, set the initial value of the read gate voltage as the read gate voltage; and in response to the difference indicating the error is less than the previous error, reduce the initial value of the read gate voltage to a new value.

* * * * *